UNITED STATES PATENT OFFICE.

HENRY W. DENNY, OF EVANSTON, ILLINOIS.

COMPOSITION OF MATTER AND PROCESS OF MAKING SAME.

1,388,174.  Specification of Letters Patent.  Patented Aug. 23, 1921.

No Drawing.  Application filed September 29, 1919. Serial No. 327,273.

*To all whom it may concern:*

Be it known that I, HENRY W. DENNY, a citizen of the United States, residing at Evanston, in the county of Cook and State of Illinois, have invented a certain new and useful Improvement in Composition of Matter and Processes of Making Same, of which the following is a full, clear, concise, and exact description.

This invention relates to improvement in composition of matter and process of making same.

The object of the invention is to provide as a composition of matter, a medium, and also the process of making the same, for applying or impregnating substances, such as food products, with colors and/or flavors in an easier, more economical, and more reliable manner than heretofore.

The invention relates more particularly to the art of applying colors and flavors to foods, and especially confectionery and the invention will be described in detail in connection with the art of manufacturing confectionery but the invention is not limited to use in this particular connection since the invention may be employed with equal success in the art of applying dyes to textiles and other analogous arts.

In the art of making confectionery, as now practised, it is customary for the manufacturer to make a batch of candy of a predetermined quantity and introduce therein at the end of the cooking, the color and desired flavor. The materials which are used for coloring foodstuffs are derived from animal and vegetable sources and also from coal tar, as for instance cochineal; saffron and cudbear; and the anilin "colors." These coloring materials are produced and sold commercially in the form of dry powders or granules. Such dry colors in powdered or granular form are practically insoluble in food products and especially is this true in the case of confectionery. Consequently the food products cannot be properly colored by introducing the coloring substance in the dry commercial form. Since the coloring substance will not dissolve directly in the food products it cannot be distributed uniformly.

Heretofore three general methods have been employed for the purpose of applying colors to food products. One such method is for the operator or confectioner to place a small amount of the dry color in a vessel, add thereto a little hot water, the mixture being then stirred and poured into the substance to be colored. By this method, a large percentage of the color remains undissolved, is wasted and the full tinctorial value is not obtained, it being understood that the actual amounts of color used are relatively small because of the concentrated nature of the color.

The second such method is for some intermediary between the dry color manufacturer and the food product manufacturer to supply a so-called "concentrated solution" of the color. The user is then required to exercise his judgment as to the amount of solution required for coloring the batch of candy or the like, being treated. Due to the concentrated nature of the solution, small variations in the quantity poured into the batch greatly vary the results and due to the loss of some of the solution sticking to the utensils used, a large percentage is wasted.

The third such method is by the use of so-called "color paste" which is generally introduced into the batch of candy or the like by means of a stick or spatula and the amount introduced is more or less dependent upon the guesswork of the user with consequent widely varying results.

In the application of flavors, which are very generally applied in concentrated solutions, similar difficulties are encountered as in the application of colors.

In carrying out my invention, I dissolve the color in a suitable solvent vehicle such as glycerin, a solution of sucrose, a solution of glucose, a solution of invert sugar or a mixture of the foregoing. Preferably, I employ glycerin because of its relative cheapness and the fact that a comparatively large quantity of the dry color will readily dissolve therein, a gallon of glycerin being able to dissolve approximately six pounds of the commercial dry colors. The color solution thus obtained then has added to it a gelatinous or jellifying substance in a softened state, the solution and gelatinous substances being then heated and thoroughly stirred into a homogenous mixture. The mass is then permitted to cool and set at ordinary temperatures. For the jellifying or gelatinizing substance, I may employ gelatin, isinglass, agar-agar and similar algæ, Irish moss, sodium stearate or combinations of these substances or equivalents.

The resultant product is a composition which is of jelly-like consistency at all normal temperatures and in which the coloring is uniformly distributed and carried in complete solution. The jelly-like composition is also characterized by the fact that it will liquify readily in the batch of candy or other substance to be impregnated with the color and thereby permits the introduction into or the impregnation of the candy and the like by the color in complete solution.

A similar composition of jelly-like consistency possessing the same characteristics as that above described may be obtained by introducing the flavor in solution in the same manner as the color. It is also obvious that the flavor and color, both in solution, may be mixed together in any desired relative proportions and then mixed with the gelatinizing substance and the finished product thereby have incorporated in it both coloring and flavoring matters.

In actual practice, it is evident that the quantity of color and/or flavor will vary greatly in the finished jelly-like composition and will be dependent upon the desired tint, the quantity of the standard batch to be mixed, the strength of the flavor desired, the characteristics of the particular candy or other food product being made. The coloring and/or flavoring vehicle will vary from 94% to 60% and the jellifying or gelatinizing material from 2% to 45%, depending upon the melting point required of the composition.

A concrete example of my invention, which will enable others to clearly understand the same, is as follows: One part by weight of dry color is dissolved in seven and one-half parts by weight of glycerin. The solution thus obtained, when at a temperature between 90° C. to 95° C. then has added to it, one and one-half parts by weight of gelatin previously softened with two parts by weight of water. This mixture is subjected to continued heat and stirred until thoroughly homogenous. If flavor is to be incorporated in the finished product, it is added preferably after the gelatin and color solution have been rendered homogenous, the flavor being in turn thoroughly incorporated in the mixture. The mass is then allowed to cool when it will set at any ordinary temperature. This jelly-like composition can be packed or wrapped and handled without difficulty or waste at ordinary temperatures; or can be weighed or measured from bulk quantities; or manufactured in tablets of predetermined weight or size; and has the quality of being liquefiable when introduced into a batch of candy or the like having a temperature above the melting point of the jelly-like composition carrying the color and/or flavor. When the composition liquefies, it is evident that the color and/or flavor, in complete solution, may be evenly distributed throughout the entire batch of the candy or the like by stirring or working it into the batch in any approved manner.

The advantages of my invention will be apparent to those skilled in the art. Among them may be mentioned the following: When a manufacturer has determined upon the proper degree of color and flavor desired in any particular candy or confection which he is promoting, tablets of the jelly-like composition of my invention may be prepared containing the exact amount of color and/or flavor and these tablets furnished to the manufacturer so that the operator uses only a single tablet for the size batch being made. In this way, all guesswork and all waste are eliminated; the candy or other food product is maintained of absolute uniformity and its manufacture made independent of the personal skill of the operator, in so far as the introduction of the color and/or flavor is concerned. It is obvious that tablets of the jelly-like color and/or flavor composition may be made in a great variety of sizes, strengths, and relative proportions of the color and flavor, where both are used in the same tablet. In actual practice I have found that one-half ounce of my improved jelly-like composition can be made to carry sufficient color to impart a deep shade to one hundred pounds of candy and a composition carrying both color and flavor can be made so that one ounce thereof will be sufficient to impart a deep shade and a strong flavor to a similar quantity of candy.

I have herein described my invention with particularity as relating to the art of making confectionery, especially candy, but I do not wish to be confined thereto and contemplate the use of my invention in all other connections and arts that come within the scope of the claims appended hereto, and in connection with the claims, I have employed the term "sense-stimulating" as generically descriptive of either color or flavor and as inclusive of either or both.

I claim:

1. A sense-stimulating composition of matter for impregnating purposes, which is solid at ordinary temperatures, comprising, a jellifying material having substantially uniformly ad-mixed therewith, a sense-stimulating substance proper previously placed in solution, the composition of matter being liquefiable in the substance to be treated to thereby permit the impregnation of the substance by said dissolved sense-stimulating substance proper.

2. The herein described process of producing a sense-stimulating composition of matter having a solid constituency at normal temperatures which consists in: dissolving the sense-stimulating substance proper in a suitable solvent vehicle; mixing the solution thus obtained with a previously softened jellifying material; and then permitting the mixture to jellify.

3. A sense-stimulating composition of matter for impregnating purposes, which is solid at ordinary temperatures, comprising, a jellifying substance; color and/or flavor in solution, the latter being mixed with the jellifying material, the jellifying material being the proportion 5% to 45% and the solution in the proportion 95% to 55%.

4. A sense-stimulating composition of matter comprising, a glycerin solution of a sense-stimulating substance proper mixed with gelatin in the proportion, 94% to 60% solution and 2% to 45% gelatin.

5. A coloring composition of matter comprising, dry color dissolved in glycerin mixed with gelatinous material of jelly-like consistency at ordinary temperatures.

6. An edible coloring composition comprising, dry color dissolved in glycerin in a ratio of one part dry color and seven and one-half parts glycerin, combined with one and one-half parts by weight of gelatin treated with two parts by weight of water.

In witness that I claim the foregoing I have hereunto subscribed my name this 12th day of Sept. 1919.

HENRY W. DENNY.

Witness:
META SCHMIDT.